United States Patent
Strand et al.

(10) Patent No.: US 9,104,885 B1
(45) Date of Patent: Aug. 11, 2015

(54) PROVIDING ACCESS TO APPLICATION DATA

(75) Inventors: William Alexander Strand, Issaquah, WA (US); Luan K. Nguyen, Auburn, WA (US); Ahamed A. Kannanari, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 231 days.

(21) Appl. No.: 13/410,980

(22) Filed: Mar. 2, 2012

(51) Int. Cl.
G06F 17/30 (2006.01)
G06F 21/62 (2013.01)
H04W 8/20 (2009.01)

(52) U.S. Cl.
CPC . *G06F 21/62* (2013.01); *H04W 8/20* (2013.01)

(58) Field of Classification Search
CPC ... G06F 21/606; G06F 21/62; G06F 21/6218; G06F 21/305; G06F 21/335; G06F 21/78; H04L 29/08702; H04L 29/08711; H04L 29/08801; H04L 29/08828; H04W 8/245; H04W 8/60; H04W 8/20
USPC ...... 726/2–7, 26–33; 713/189, 193; 709/223–229
See application file for complete search history.

(56) References Cited

U.S. PATENT DOCUMENTS

| | | | | |
|---|---|---|---|---|
| 7,680,882 B2 * | 3/2010 | Tiu et al. | | 709/203 |
| 8,438,342 B1 * | 5/2013 | Todd et al. | | 711/153 |
| 8,468,585 B2 * | 6/2013 | Choi et al. | | 726/8 |
| 8,533,708 B2 * | 9/2013 | Kamada et al. | | 717/178 |
| 8,538,376 B2 * | 9/2013 | Lee et al. | | 455/405 |
| 8,556,174 B2 * | 10/2013 | Caballero | | 235/449 |
| 8,562,434 B2 * | 10/2013 | Goller et al. | | 463/36 |
| 8,572,725 B2 * | 10/2013 | Ma | | 726/16 |
| 8,688,966 B2 * | 4/2014 | Curtis et al. | | 713/2 |
| 8,694,577 B2 * | 4/2014 | D'Angelo et al. | | 709/203 |
| 2009/0106110 A1 * | 4/2009 | Stannard et al. | | 705/14 |
| 2010/0248699 A1 * | 9/2010 | Dumais | | 455/414.1 |
| 2012/0242701 A1 * | 9/2012 | Ingrassia, Jr. | | 345/649 |
| 2013/0005487 A1 * | 1/2013 | Frazzini et al. | | 463/43 |
| 2013/0066832 A1 * | 3/2013 | Sheehan et al. | | 707/634 |
| 2013/0171978 A1 * | 7/2013 | Dumais et al. | | 455/414.1 |

FOREIGN PATENT DOCUMENTS

CA WO 2012/037675 * 9/2011 .............. H04W 8/20

* cited by examiner

Primary Examiner — Nirav B Patel
(74) Attorney, Agent, or Firm — Thomas | Horstemeyer, LLP

(57) ABSTRACT

Disclosed are various embodiments for providing access to application data stored by multiple applications across multiple devices of a user. A request to store application data is obtained by a data storage service from an application associated with a user. The application is executed in a client computing device, and the request specifies a security credential and is obtained by way of a network. The application data is stored by the data storage service in response to the request to store. The data storage service may be configured to store data for multiple applications associated with the user, and each of the applications may be associated with a different security credential.

24 Claims, 7 Drawing Sheets

PROVIDING ACCESS TO APPLICATION DATA

BACKGROUND

Applications, such as mobile applications, game applications, electronic book reader applications, productivity applications, communication applications, multimedia applications, and so on, may utilize various types of application data. The application data may include settings and/or other parameters that configure or customize the operation of the application.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to providing access to application data for applications. While application data is normally saved on the local device and used only by the application that has written it, it may be desirable to make such application data accessible to multiple applications and multiple devices. As a non-limiting example, a user who has completed a certain achievement in a game may wish to save the current game state and make that game state available to another device. As another non-limiting example, a user may prefer that all applications executed in a particular mobile device be configured to use a certain audio volume setting.

Various embodiments of the present disclosure provide a centralized data store for the management of application data. This data store may provide access to the application data for the same application across multiple devices of a user. This data store may also provide access to application data for multiple applications to enable cross-application preferences and/or other configuration settings. The centralized application data may facilitate access to preferences among various dimensions, including user, device, location, and/or other dimensions. In the following discussion, a general description of the system and its components is provided, followed by a discussion of the operation of the same.

Figure 1:
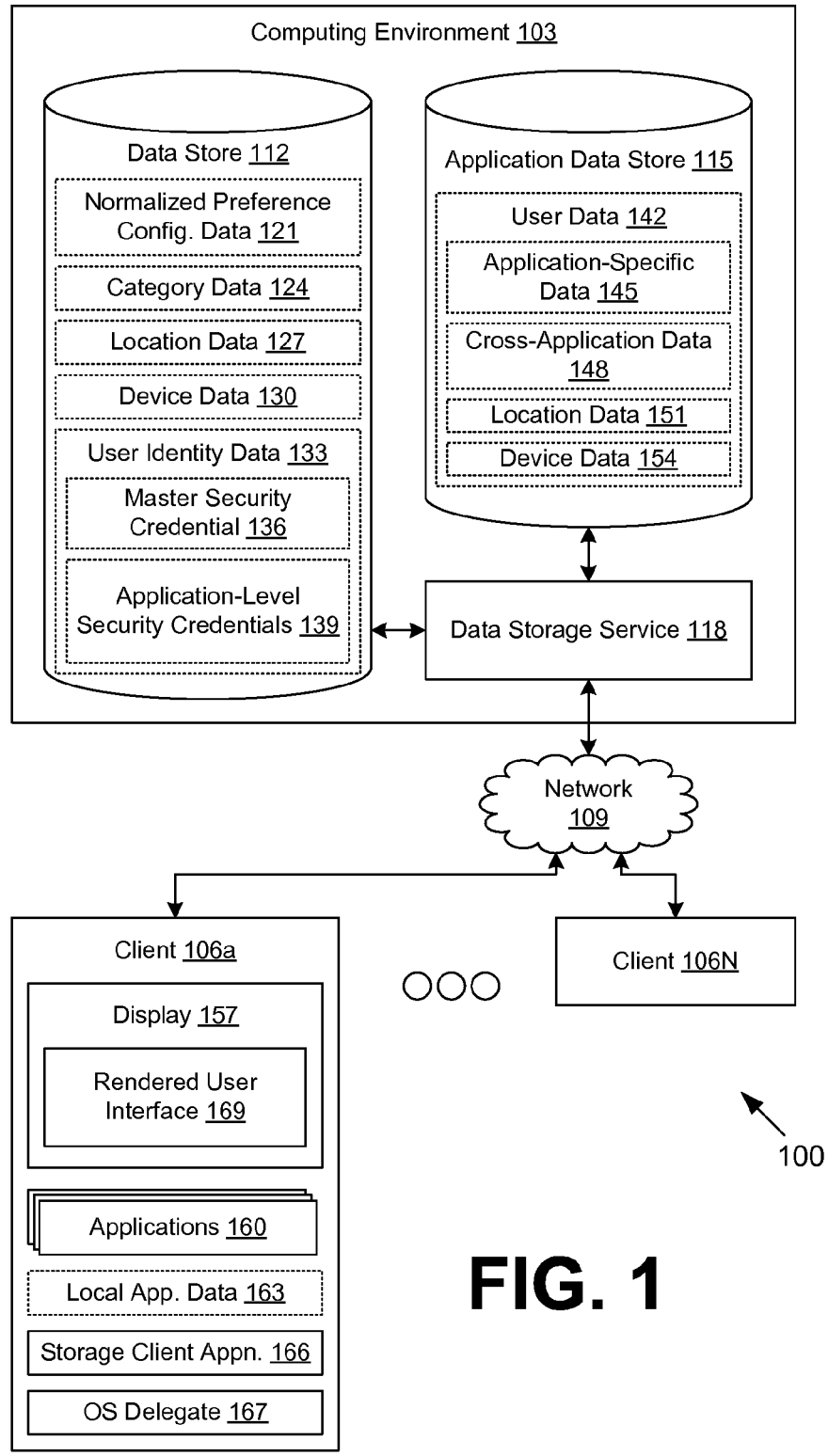
FIG. 1 is a drawing of a networked environment according to various embodiments of the present disclosure.

With reference to FIG. 1, shown is a networked environment 100 according to various embodiments. The networked environment 100 includes a computing environment 103 in data communication with a plurality of clients 106a . . . 106N by way of a network 109. The network 109 includes, for example, the Internet, intranets, extranets, wide area networks (WANs), local area networks (LANs), wired networks, wireless networks, or other suitable networks, etc., or any combination of two or more such networks.

The computing environment 103 may comprise, for example, a server computer or any other system providing computing capability. A plurality of computing devices may be employed by the computing environment 103 that are arranged, for example, in one or more server banks or computer banks or other arrangements. For example, a plurality of computing devices together may comprise a cloud computing resource, a grid computing resource, and/or any other distributed computing arrangement. Such computing devices may be located in a single installation or may be distributed among many different geographical locations. The computing environment 103 may be operated by a third-party entity relative to the users associated with the clients 106 or the publishers or developers of the applications executed in the clients 106. That is to say, the computing environment 103 may be operated by an entity that is not a publisher of the applications executed in the clients 106. In some cases, the computing environment 103 may be equipped to provide cloud storage services or other services under a utility computing model. The use of the term "cloud" herein is not intended to be limiting.

Various applications and/or other functionality may be executed in the computing environment 103 according to various embodiments. Also, various data is stored in a data store 112 and an application data store 115 that are accessible to the computing environment 103. The data store 112 and the application data store 115 may each be representative of a plurality of data stores as can be appreciated. The data stored in the data store 112 and the application data store 115, for example, are associated with the operation of the various applications and/or functional entities described below.

The components executed on the computing environment 103, for example, include a data storage service 118 and other applications, services, processes, systems, engines, or functionality not discussed in detail herein. The data storage service 118 is executed to facilitate storage and retrieval of application data from the application data store 115. Such application data may encompass application settings and preferences, saved application state data, and/or other data stored by client applications. The data storage service 118 may be configured to authenticate the applications using application-level security credentials such that applications may have access to their own data but not access to data from other applications. In some cases, access preferences, settings, and/or other data may be shared among multiple applications. In one embodiment, the data storage service 118 is associated with an identity provider, and the application data of a user may be associated with the identity of the user as managed by the identity provider.

The data stored in the data store 112 includes, for example, normalized preference configuration data 121, category data 124, location data 127, device data 130, user identity data 133, and potentially other data. The normalized preference configuration data 121 includes configuration data that relates to recognizing and translating normalized preferences stored by the data storage service 118. A normalized preference corresponds to a preference or setting that has been "normalized" so as to be applicable across multiple clients 106.

As a non-limiting example, various different clients 106 may have different scales for audio or volume level. An 80% volume level for an electronic book reader may be relatively quiet, while an 80% volume level for a web-enabled television may be unacceptably loud. Accordingly, the data storage service 118 may be configured to translate 80% on a normalized volume scale to 100% on the electronic book reader and 40% on the web-enabled television. The numerical figures given in this example are merely for purposes of illustration and are not intended to be limiting.

The category data 124 may be employed for grouping cross-application preferences and settings into various categories. For example, the category data 124 may group applications into categories such as games, web browsing applications, office applications, and so on. A preference such as preferred language, preferred volume level, preferred text size, etc. may be enabled on a per-category basis across applications in one or more selected categories.

The location data 127 may be employed to group cross-application preferences and settings into location-specific groupings. For example, a client 106 may include a global positioning system (GPS) or other location-determining device, and the client 106 may be configured to report its location to the data storage service 118 or other service associated with an identity provider. The location data 127 may be used to identify patterns in locations and to recognize groupings based upon the patterns in location. Consequently, preferences for applications may be divided into those which are applicable at a "home" location, those which are applicable at a "work" location, those which are applicable when traveling between "home" and "work" and vice versa, and/or preference-location groupings.

The device data 130 may be used to determine the capabilities of the various clients 106 and platforms, operating systems, and so on for various clients 106. For example, the device data 130 may identify the different audio capabilities, display capabilities, input device capabilities, and/or other characteristics of the clients 106. To illustrate, an electronic book reader may have capabilities that are different from a smartphone. The electronic book reader may, for example, have a larger screen than the smartphone. However, the smartphone may have a GPS device and a camera, which may be absent from the smartphone. Accordingly, some preferences for applications executed in the electronic book reader may be in applicable to applications executed in the smartphone, and vice versa. Nonetheless, some preferences may be applicable to both platforms.

The user identity data 133 may include various data regarding user identities which are managed by an identity provider. In some cases, the operator of the computing environment 103 and the data storage service 118 may be the identity provider. In other cases, the identity provider may be a separate entity. The user identity data 133 may include, for each user, one or more master security credentials 136, one or more application-level security credentials 139, and/or other data. The master security credentials 136 may correspond to the usernames, passwords, keys, tokens, etc. which are used by a user to gain access to the application data resources hosted by the data storage service 118 on behalf of the user.

By contrast, the application-level security credentials 139 are used by particular applications to access their respective application data hosted by the data storage service 118 on behalf of the user. The application-level security credentials 139, which may include usernames, passwords, keys, tokens, folder identifiers, etc., may differ among different applications of the user. This facilitates a secured separation among the applications so that one application of the user may be restricted from accessing data of other applications of the user. As a consequence, it may be unnecessary to reveal the master security credential(s) 136 to the individual applications, thereby enhancing security for the master security credential(s) 136.

The application data store 115 is configured to store various user data 142, which may include application-specific data 145, cross-application data 148, location data 151, device data 154, and/or other data. The application-specific data 145 corresponds to application data stored by a particular application of the user to which access by other applications of the user is restricted. The access may be completely restricted, or the other applications may have read-only access in some embodiments. The cross-application data 148 corresponds to application data that is accessible by multiple applications of the user. Such access may be read-write access or read-only access. Where the application-specific data 145 and the cross-application data 148 comprise preferences, the data storage service 118 may be configured to organize the preferences by category, location, device, etc.

In some cases, the data storage service 118 may be configured to perform translation of preferences between device-specific preferences and device-normalized preferences. The location data 151 may indicate which locations are applicable for certain application data, such as preferences and/or other data. The device data 154 may indicate which clients 106 or device platforms are applicable for certain application data, such as preferences and/or other data.

The clients 106a . . . 106N are representative of a plurality of different client devices that may be coupled to the network 109. Each client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. Each client 106 may include a display 157. The display 157 may comprise, for example, one or more devices such as cathode ray tubes (CRTs), liquid crystal display (LCD) screens, gas plasma-based flat panel displays, LCD projectors, or other types of display devices, etc. Each client 106 may also include various devices such as, for example, cameras, accelerometers, audio input devices, audio output devices, touchscreens, GPS receivers, cellular telephone transceivers, and/or other devices.

Each client 106 may be configured to execute one or more applications 160. The applications 160 may comprise, for example, mobile applications, game applications, productivity applications, web browsing applications, multimedia player applications, social networking applications, document viewing applications, and/or other applications. In some cases, the applications 160 may be configured to store preferences, settings, saved state data, and/or other data to the local application data 163 of the client 106.

The client 106 is configured to execute a storage client application 166 in order to provide access to the data managed by the data storage service 118. The storage client application 166 may be configured to facilitate creation and management of file folders and application-level security credentials 139, upload and download application data to and from the data storage service 118, establish preferences and settings for applications 160, obtain preferences and settings from applications 160, synchronize local application data 163 with remote application data, and/or perform other functions. Although the storage client application 166 is described as a separate application executed in the client 106, in some embodiments the storage client application 166 may correspond to an application programming interface (API) with one or more code libraries. The applications 160 and/or the storage client application 166 may be configured to generate a rendered user interface 169 on the display 157.

Additionally, in some embodiments, the client 106 may be configured to execute an operating system delegate 167 in conjunction with the storage client application 167. The operating system delegate 167 may be configured to enforce restrictions on access to the application-specific data 145 based upon the identity of the applications 160. Specific applications 160 may be given read-write access, read-access, or no access to application-specific data 145. The storage client application 166 may be configured to present a master security credential 136 or one or more token(s) indicating authentication in order to access the application-specific data 145. Thus, the operating system delegate 167 may function as an intermediary between the application 160 and the storage client application 166 to facilitate access to the data stored in the application data store 115. The client 106 may be configured to execute applications beyond those mentioned above.

Next, a general description of the operation of the various components of the networked environment 100 is provided. To begin, a user creates an identity with an identity provider. In doing so, the user establishes one or more master security credentials 136 in the user identity data 133. The identity may be used, for example, for shopping, email communication, social networking, and/or other purposes. An application data store 115 may be operated by or in conjunction with an identity provider. A user is able to create an account to store data in the application data store 115 using the master security credential 136. In some cases, the storage account may be automatically created as part of identity enrollment.

In a first embodiment, the data storage service 118 provides central management of data stored by various applications 160 using different corresponding application-level security credentials 139. The user enables access for a particular application 160 using the master security credential 136. As part of this process, one or more application-level security credentials 139 are created for the application 160. Such application-level security credentials 139 may be automatically generated or manually specified. The clients 106 may communicate with the data storage service 118 using the storage client application 166. The storage client application 166 may employ hypertext transfer protocol (HTTP), HTTP secure (HTTPS), representational state transfer (REST), simple object access protocol (SOAP), JavaScript object notation (JSON), remote procedure call (RPC), and/or other protocols to communicate with the data storage service 118.

The application-level security credentials 139 enable the respective applications 160 to store and access application-specific data 145 and, potentially, cross-application data 148. By assigning unique security credentials at the application level, an application 160 may be restricted from accessing data stored by another application 160. Such restrictions may be useful for privacy reasons and/or to prevent intentional or accidental misuse of the data of the other application 160. In some cases, the data of the applications 160 may be organized into folders and subfolders, where each application 160 has a respective folder for application-specific data 145.

As a non-limiting example, a game application 160 may generate application data corresponding to a saved state. The saved state may correspond to a point in the game application 160 that may require many hours and achievements to reach. Such data may be saved in the local application data 163, but this would not allow a user to resume the game application 160 from other devices. Alternatively, or additionally, the game application 160 may save the data to a folder in the application data store 115 as described herein using the data storage service 118. This allows the user to save the game state on one client 106 and resume the game at that saved state on a different client 106.

In one example, a publisher may have a folder for multiple applications 160 using the same application-level security credentials 139. In such a case, the applications 160 of the publisher may have access to the data stored by one another. Such applications 160 may organize their application data in subfolders of the folder associated with the publisher.

Although the application data in the application data store 115 may be protected from access by other applications 160, in some cases it may be desirable to give access to other applications 160. Such data may be stored in the cross-application data 148. Other applications 160 may have read-write access or read only access to the cross-application data 148. Further, in some cases, other applications 160 may have read-write access or read only access to the application-specific data 145 stored by another application 160. Applications 160 may be granted access to specific data as a group or individually as desired.

In a second embodiment, the application data store 115 may correspond to an application preference store rather than being organized specifically into application folders and subfolders. A user may configure various preferences for an application 160 including, for example, text size, audio volume level, language, user interface control configuration, and so on. The user may desire that the preferences for an application 160 as configured for one client 106 be available in another client 106 without having to manually duplicate the preferences in the local application data 163. Likewise, the user may desire that the preferences for one application 160 be available for another application 160.

To this end, each application 160 may obtain and store preferences and/or settings by way of an application or API such as the storage client application 166. The storage client application 166 interfaces with the data storage service 118 over the network 109 to store the preferences in the application data store 115. In one example, the storage client application 166 may be integrated with an operating system of the client 106. The preferences may be associated with an identity of a user maintained by an identity provider and secured using at least one master security credential 136.

The data storage service 118 and/or the storage client application 166 may perform translation of a requested preference to the actual data which is provided to the application 160. For example, a particular application 160 may request a volume level from the storage client application 166. The volume level that is provided to the application 160 may depend on the user, the platform or device configuration of the client 106, a category associated with the application 160, a location of the client 106, and/or other factors. Information indicating the user, platform, device configuration, category of application 160, location, etc. may be provided to the storage client application 166 and/or the data storage service 118 along with the request to obtain the preference and/or along with a request to store/update the preference.

The data storage service 118 may refer to various data in the data store 112 in order to determine which preference to return to the requesting application 160. As an example, the data storage service 118 may be configured to translate a preference that is specific to a particular device, platform, or application 160 to a normalized preference, and vice versa, using the normalized preference configuration data 121 (e.g., translate a 50% normalized volume to a 100% actual volume for a particular electronic book reader, etc.). As another example, the data storage service 118 may be configured to update and return a preference according to the category of the requesting application 160 as indicated in the category data 124 (e.g., run game applications 160 in full screen mode by default, etc.). As another example, the data storage service 118 may be configured to update and return a preference according to the platform or device of the client 106 and the device data 130 and/or the device data 154 associated with a stored preference (e.g., turn off Wi-Fi on a tablet computer when a certain application 160 is used, etc.). As yet another example, the data storage service 118 may be configured to update and return a preference according to the location of the requesting client 106 and the location data 127 and/or the location data 151 associated with a stored preference (e.g., mute volume of an application 160 on a laptop computer when at an office location, etc.).

Figure 2A:
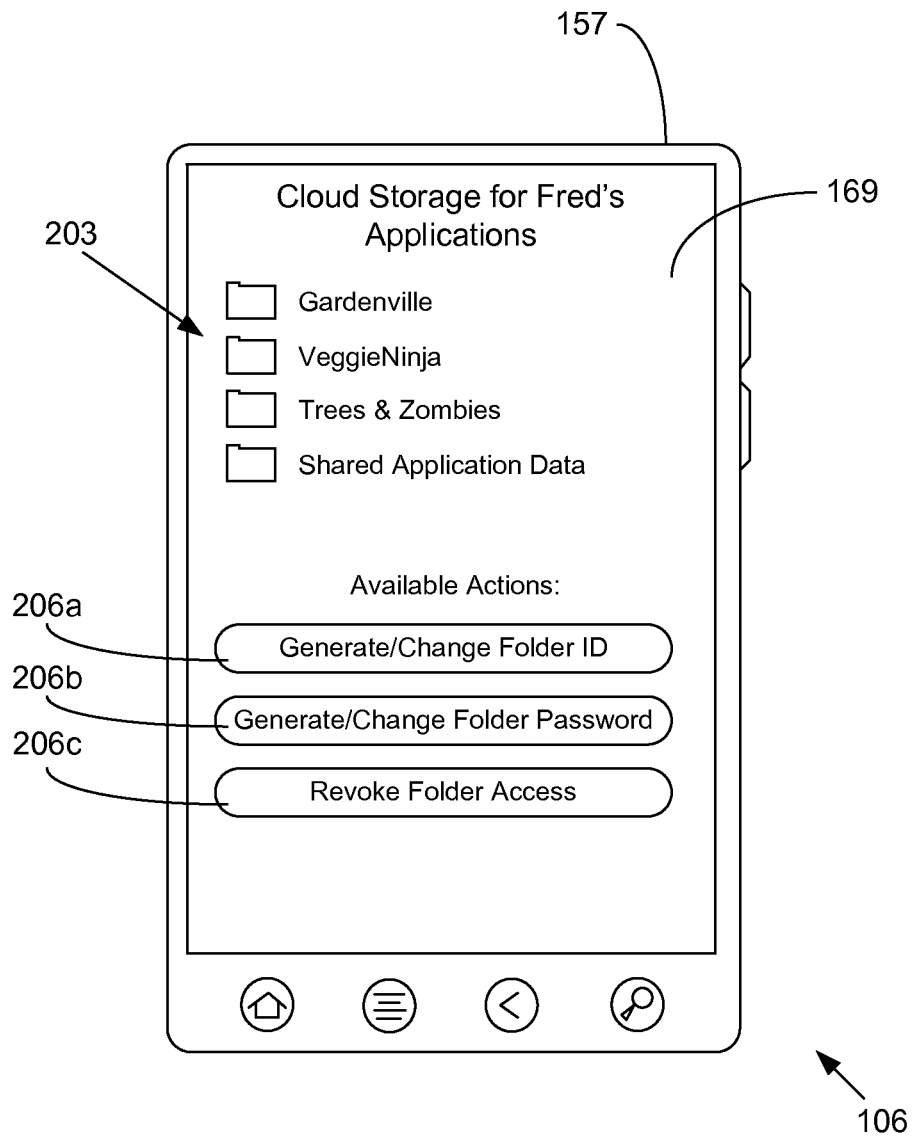
FIGS. 2A and 2B are as drawing of examples of user interfaces rendered by a client in the networked environment of FIG. 1 according to various embodiments of the present disclosure.

Referring next to FIG. 2A, shown is one example of a client 106 according to one embodiment. The example client 106 of FIG. 2A corresponds to mobile device having a touchscreen display 157. Shown on the display 157 is a rendered user interface 169 generated by the storage client application 166 (FIG. 1). Although a mobile device is shown in the non-limiting example of FIG. 2A, it is understood that variations of the rendered user interface 169 may be rendered on any client 106, including desktop computers, laptop computers, and so on. The rendered user interface 169 has a title of "Cloud Storage for Fred's Applications," which indicates that the user is, or may be, logged into the data storage service 118 (FIG. 1) with an identity of "Fred."

An application data listing 203 indicates four file folders or subdivisions of the user data 142 (FIG. 1) corresponding to three games ("Gardenville," "VeggieNinja," "Trees & Zombies") and a shared folder ("Shared Application Data"). In this non-limiting example, each of the folder corresponding to the three games may be restricted such that each of the corresponding applications 160 (FIG. 1) has access to its respective folder and data and not to the folders and data of the other applications 160. An exception may be provided for the "Shared Application Data," which may include preferences and settings which may be common to all applications 160 or groups of applications 160.

Several user action controls 206a, 206b, and 206c may be provided in the rendered user interface 169. The user action control 206a is labeled "Generate/Change Folder ID," and may be configured to enable creating or renaming a file folder. In some embodiments, the name or identifier associated with the file folder may be considered part of the application-level security credential 139 (FIG. 1) for the file folder. The user action control 206b is labeled "Generate/Change Folder Password," and may be configured to enable creating or changing an application-level security credential 139 such as a password and so on. The application-level security credential 139 may be manually specified by way of a rendered user interface 169, automatically generated by the storage client application 166, or automatically generated by the data storage service 118.

The user action control 206c is labeled "Revoke Folder Access," and may be configured to enable revocation of access to a folder by one or more applications 160. This may be desirable if it is discovered that an application 160 has a security vulnerability, is consuming too much storage space in the application data store 115, or for other reasons. Other user action controls 206 may be provided in other embodiments.

Figure 2B:
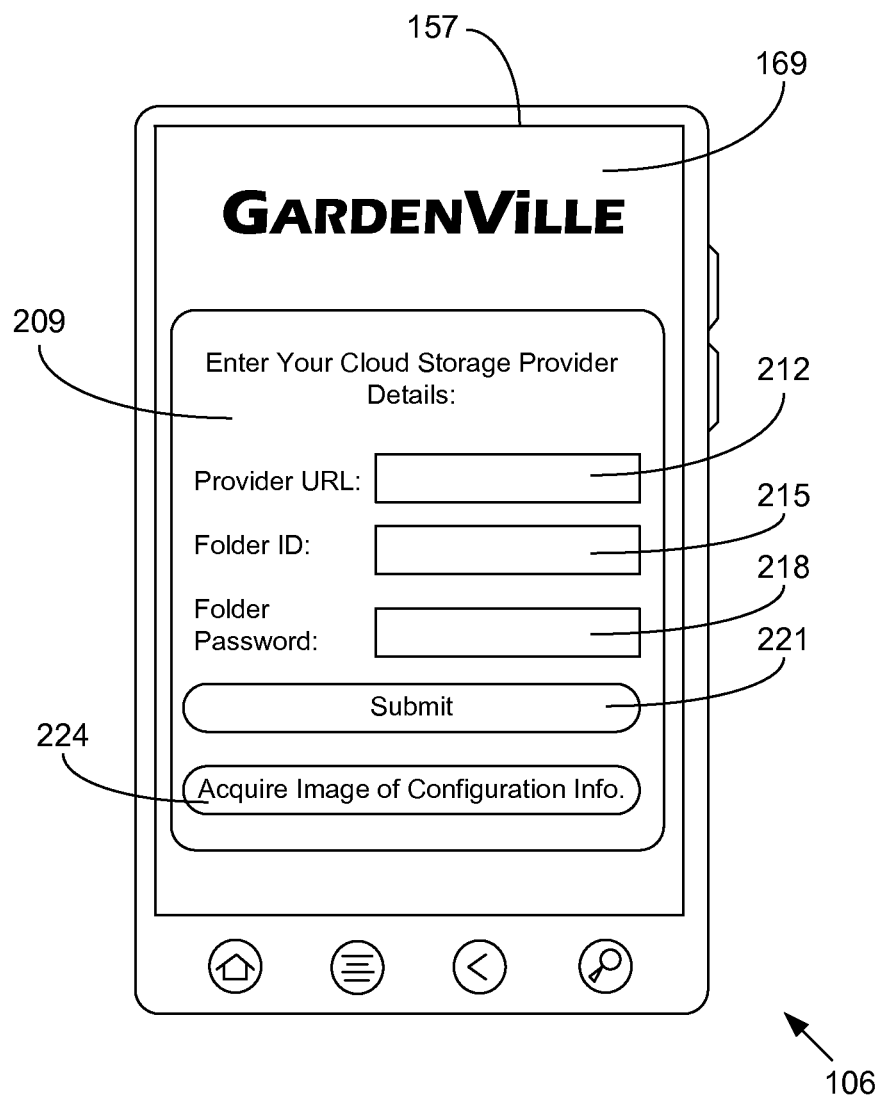

Turning now to FIG. 2B, shown is another example of a client 106 according to one embodiment. The example client 106 of FIG. 2B corresponds to mobile device having a touchscreen display 157. Shown on the display 157 is a rendered user interface 169 generated by an application 160 (FIG. 1) and the storage client application 166 (FIG. 1). The rendered user interface 169 has a title of "GardenVille," which corresponds to a currently executed game application 160 in the client 106.

In this non-limiting example, a dialog 209 is generated by the storage client application 166 as part of the rendered user interface 169. The dialog 209 facilitates entry of security credentials and/or other information to connect to the data storage service 118 (FIG. 1). To this end, the dialog 209 includes a provider entry component 212, a folder identifier entry component 215, a folder password entry component 218, and/or other components. The provider entry component 212 facilitates user specification of a data storage provider, which may include an internet protocol (IP) address, a domain name, a uniform resource locator (URL), and/or other data. It is noted that the storage client application 166 may be configured to function with multiple different data storage providers, and communication between the storage client application 166 and the different data storage services 118 may be by way of a standard application-level protocol.

The folder identifier entry component 215 allows entry of a folder identifier, which uniquely identifies an application data folder in the user data 142 (FIG. 1). The folder identifier may be considered an application-level security credential 139 (FIG. 1). The folder password entry component 218 allows entry of a folder password, which secures the corresponding application data folder. The folder password also may be considered an application-level security credential 139. A submit component 221 may be provided in order to indicate that the entered data should be used to configure the access of an application 160 to the data storage service 118.

In one embodiment, an acquire image component 224 may be provided to trigger acquisition of an image (e.g., from an internal camera, from a file, from an email account, etc.) containing configuration information. For example, the image may be of a QR code or other computer readable encoding. In some cases, the image may contain text which may be recognized using optical character recognition (OCR). The image may encode, for example, provider identification, folder identification, folder password, and/or other configuration parameters. With this embodiment, configuration information from one client 106 may be easily transferred to another a client 106 via image presentation and capture without complicated data entry.

Figure 3A:
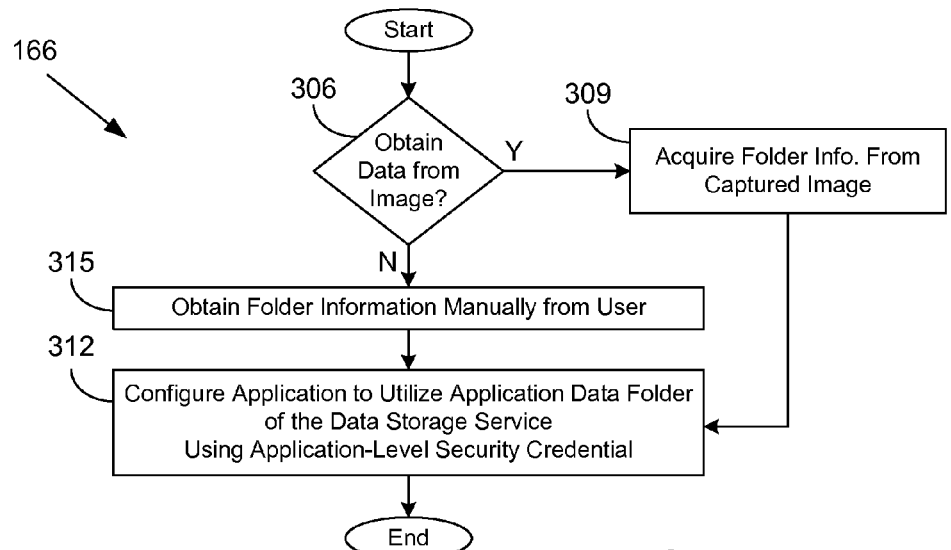
FIGS. 3A, 3B, and 4 are flowcharts illustrating examples of functionality implemented as portions of a storage client application executed in a client in the networked environment of FIG. 1 according to various embodiments of the present disclosure.

Referring next to FIG. 3A, shown is a flowchart that provides one example of the operation of a portion of the storage client application 166 according to various embodiments. In particular, the flowchart of FIG. 3A relates to configuration of applications 160 (FIG. 1) to use particular folders. It is understood that the flowchart of FIG. 3A provides merely an example of the many different types of functional arrangements that may be employed to implement the operation of the portion of the storage client application 166 as described herein. As an alternative, the flowchart of FIG. 3A may be viewed as depicting an example of steps of a method implemented in the client 106 (FIG. 1) according to one or more embodiments.

Beginning with box 306, the storage client application 166 determines whether configuration data is to be acquired from an image. If configuration data is to be acquired from an image, the storage client application 166 moves to box 309 and acquires the folder information from a captured image. The folder information may include, for example, one or more application-level security credentials 139 (FIG. 1) and/or other configuration parameters. The storage client application 166 then proceeds to box 312.

If configuration data is not to be acquired from an image, the storage client application 166 instead moves from box 306 to box 315. In box 315, the storage client application 166 obtains the folder information manually from the user. For example, a rendered user interface 169 such as that displayed in FIG. 2B may be employed. The folder information may include, for example, one or more application-level security credentials 139 and/or other configuration parameters. The storage client application 166 then continues to box 312.

In box 312, the storage client application 166 configures the application 160 to utilize the application data folder that previously exists. To this end, the storage client application 166 configures the application 160 to use the particular data storage service 118 and present the application-level security credential(s) 139. Thereafter, the portion of the storage client application 166 ends.

Figure 3B:
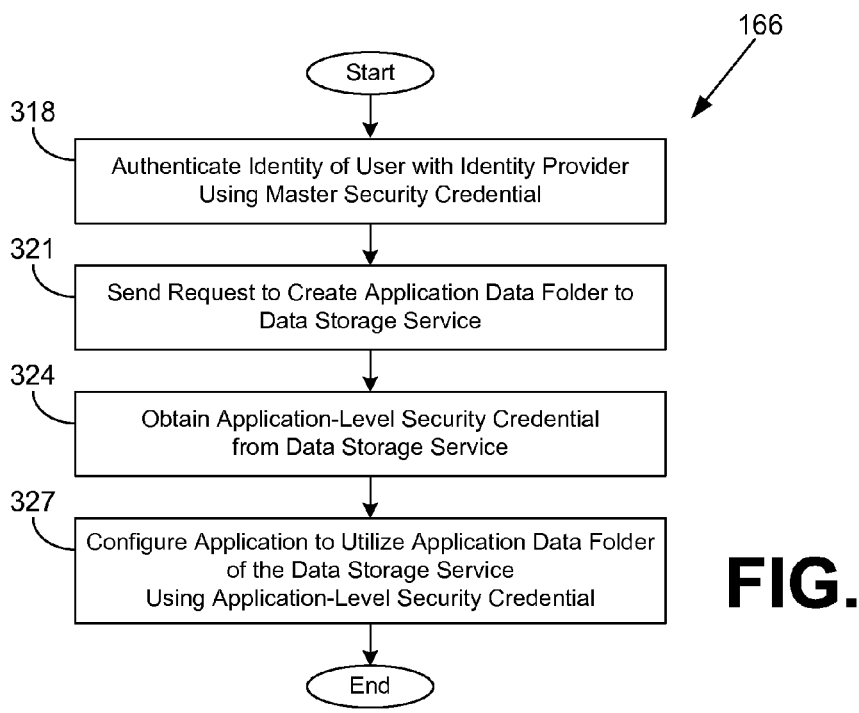

Moving on to FIG. 3B, shown is a flowchart that provides one example of the operation of another portion of the storage client application 166 according to various embodiments. In particular, the flowchart of FIG. 3B relates to folder creation in the user data 142 (FIG. 1). It is understood that the flowchart of FIG. 3B provides merely an example of the many different types of functional arrangements that may be employed to implement the operation of the portion of the storage client application 166 as described herein. As an alternative, the flowchart of FIG. 3B may be viewed as depicting an example of steps of a method implemented in the client 106 (FIG. 1) according to one or more embodiments.

Beginning with box 318, the storage client application 166 authenticates the identity of the user with the identity provider using a master security credential 136 (FIG. 1) obtained from the user. In box 321, the storage client application 166 sends a request to the data storage service 118 (FIG. 1) by way of the network 109 (FIG. 1) to create an application data folder in the application data store 115 (FIG. 1). The request may include the master security credential 136, which may, for example, correspond to a token indicating a current authentication status. In box 324, assuming that the application data folder was successfully created in the application data store 115, the storage client application 166 obtains an application-level security credential 139 (FIG. 1) from the data storage service 118. The application-level security credential 139 may correspond to a folder identifier, folder password, etc. The storage client application 166 continues to box 327.

In box 327, the storage client application 166 configures the application 160 to utilize the application data folder that is newly created. To this end, the storage client application 166 configures the application 160 (FIG. 1) to use the particular data storage service 118 and present the application-level security credential(s) 139. Thereafter, the portion of the storage client application 166 ends.

Figure 4:
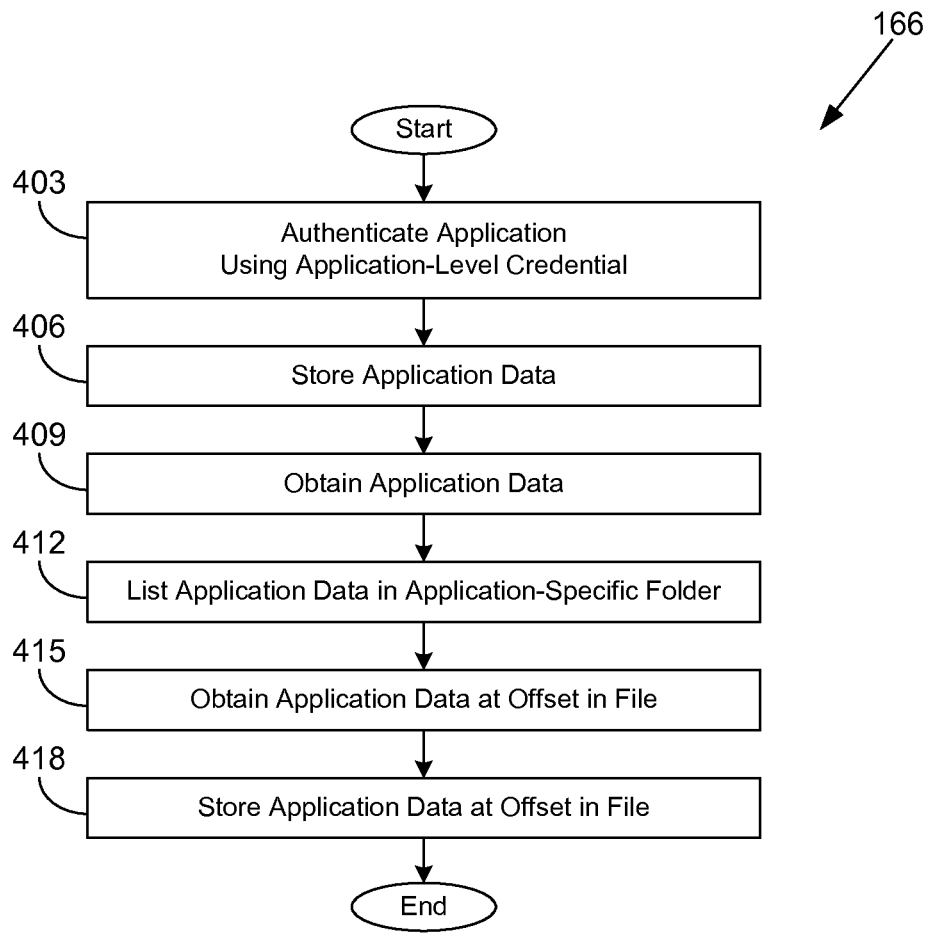

Turning now to FIG. 4, shown is a flowchart that provides one example of the operation of yet another portion of the storage client application 166 according to various embodiments. In particular, the flowchart of FIG. 4 relates to various actions that may be performed by an application 160 (FIG. 1) using the storage client application 166 relative to an application data store 115 (FIG. 1). It is understood that the flowchart of FIG. 4 provides merely an example of the many different types of functional arrangements that may be employed to implement the operation of the portion of the storage client application 166 as described herein. As an alternative, the flowchart of FIG. 4 may be viewed as depicting an example of steps of a method implemented in the client 106 (FIG. 1) according to one or more embodiments.

Beginning with box 403, the storage client application 166 authenticates with the data storage service 118 (FIG. 1) using one or more application-level security credentials 139 (FIG. 1). In box 406, the storage client application 166 stores application data in the application data store 115. In box 409, the storage client application 166 obtains application data from the application data store 115. In box 412, the storage client application 166 obtains a listing of application data that is stored in a folder containing application-specific data 145 (FIG. 1). In box 415, the storage client application 166 obtains application data starting at a specified offset in a file.

In box 418, the storage client application 166 stores application data in the application data store 115 at a specified offset in a file. Thereafter, the portion of the storage client application 166 ends. It is noted that the actions described in connection with the flowchart of FIG. 4 may be performed relative to the local application data 163 (FIG. 1) in some embodiments. The storage client application 166 may then be configured to synchronize the local application data 163 to the application data store 115. In such cases, the application 160 may write to and read from the local application data 163 which may be synchronized on demand, periodically, when the application 160 starts, when the application 160 exits, or at other times.

Figure 5:
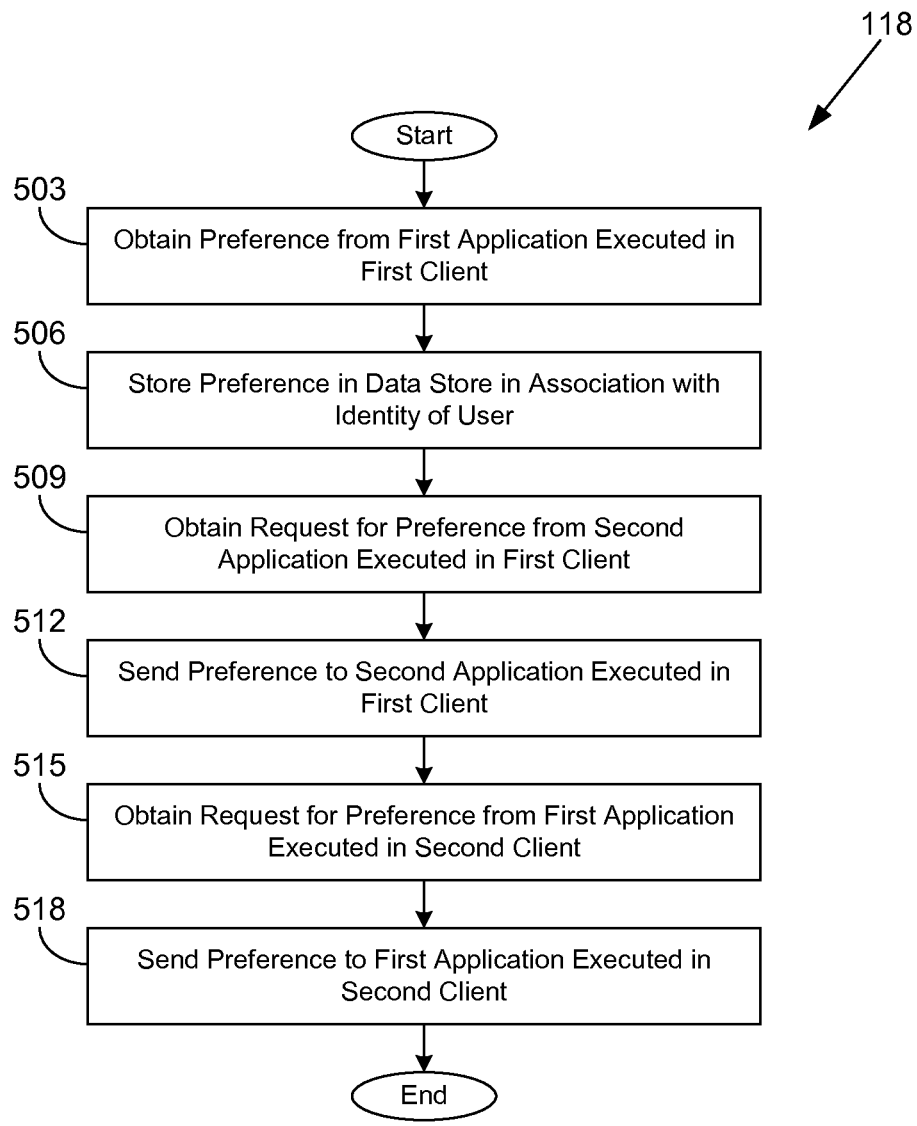
FIG. 5 is a flowchart illustrating one example of functionality implemented as portions of a data storage service executed in a computing environment in the networked environment of FIG. 1 according to various embodiments of the present disclosure.

Moving on to FIG. 5, shown is a flowchart that provides one example of the operation of a portion of the data storage service 118 according to various embodiments. In particular, FIG. 5 relates to cross-application preferences that may be applied across multiple devices. It is understood that the flowchart of FIG. 5 provides merely an example of the many different types of functional arrangements that may be employed to implement the operation of the portion of the data storage service 118 as described herein. As an alternative, the flowchart of FIG. 5 may be viewed as depicting an example of steps of a method implemented in the computing environment 103 (FIG. 1) according to one or more embodiments.

Beginning with box 503, the data storage service 118 obtains a preference from a first application 160 (FIG. 1) executed in a first client 106 (FIG. 1). In box 506, the data storage service 118 stores the preference in the application data store 115 (FIG. 1) in association with an identity of a user in the user data 142 (FIG. 1). In box 509, the data storage service 118 obtains a request for the preference from a second application 160 executed in the first client 106. In box 512, the data storage service 118 sends the stored preference to the second application 160 executed in the first client 106. In other words, a preference from one application 160 may be shared among different applications 160.

In box 515, the data storage service 118 obtains a request for the preference from the first application 160 executed in a second client 106. In box 518, the data storage service 118 sends the stored preference to the first application 160 executed in the second client 106. In other words, a preference may be shared among different clients 106 which may correspond to different devices and device platforms. In some cases, the data storage service 118 may perform a translation of the preference from a normalized preference to a specific preference applicable to the destination platform or device. Thereafter, the portion of the data storage service 118 ends.

Figure 6:
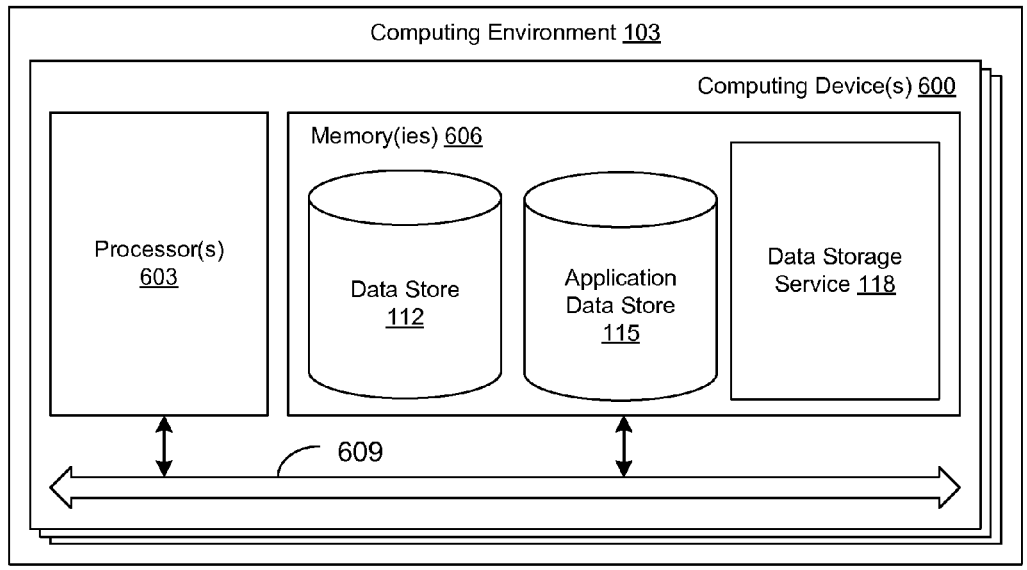
FIG. 6 is a schematic block diagram that provides one example illustration of a computing environment employed in the networked environment of FIG. 1 according to various embodiments of the present disclosure.

With reference to FIG. 6, shown is a schematic block diagram of the computing environment 103 according to an embodiment of the present disclosure. The computing environment 103 comprises one or more computing devices 600. The computing device 600 includes at least one processor circuit, for example, having a processor 603 and a memory 606, both of which are coupled to a local interface 609. To this end, the computing device 600 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the data storage service 118 and potentially other applications. Also stored in the memory 606 may be the data store 112, the application data store 115, and other data. In addition, an operating system may be stored in the memory 606 and executable by the processor 603.

Figure 7:
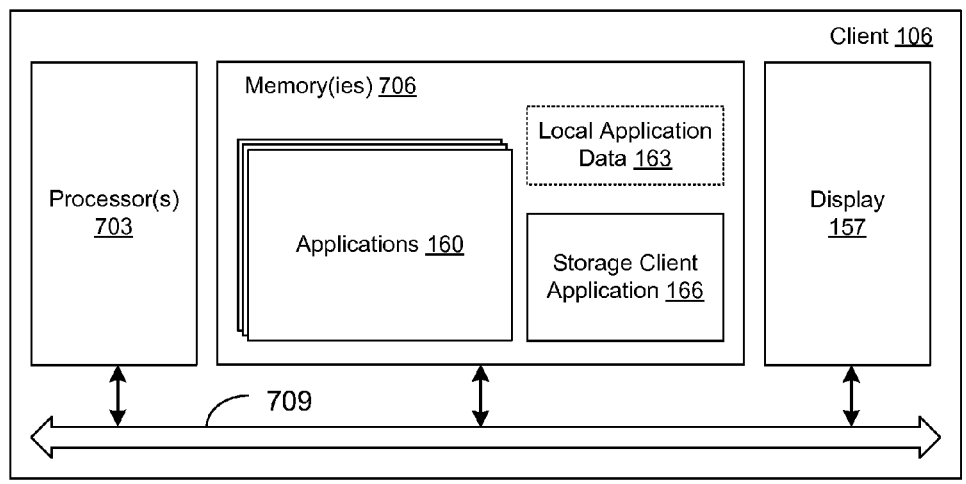
FIG. 7 is a schematic block diagram that provides one example illustration of a client employed in the networked environment of FIG. 1 according to various embodiments of the present disclosure.

Referring next to FIG. 7, shown is a schematic block diagram of the client 106 according to an embodiment of the present disclosure. The client 106 includes at least one processor circuit, for example, having a processor 703 and a memory 706, both of which are coupled to a local interface 709. To this end, the client 106 may comprise, for example, at least one client computer or like device. The local interface 709 may comprise, for example, a data bus with an accompanying address/control bus or other bus structure as can be appreciated. A display 157 may also be coupled to the local interface 709.

Stored in the memory 706 are both data and several components that are executable by the processor 703. In particular, stored in the memory 706 and executable by the processor 703 are the application 160, the storage client application 166, and potentially other applications. Also stored in the memory 706 may be the local application data 163 and other data. In addition, an operating system may be stored in the memory 706 and executable by the processor 703.

Referring now to both FIGS. 6 and 7, is understood that there may be other applications that are stored in the memory 606, 706 and are executable by the processor 603, 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 606, 706 and are executable by the processor 603, 703. In this respect, the term "executable" means a program file that is in a form that can ultimately be run by the processor 603, 703. Examples of executable programs may be, for example, a compiled program that can be translated into machine code in a format that can be loaded into a random access portion of the memory 606, 706 and run by the processor 603, 703, source code that may be expressed in proper format such as object code that is capable of being loaded into a random access portion of the memory 606, 706 and executed by the processor 603, 703, or source code that may be interpreted by another executable program to generate instructions in a random access portion of the memory 606, 706 to be executed by the processor 603, 703, etc. An executable program may be stored in any portion or component of the memory 606, 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606, 706 is defined herein as including both volatile and nonvolatile memory and data storage components. Volatile components are those that do not retain data values upon loss of power. Nonvolatile components are those that retain data upon a loss of power. Thus, the memory 606, 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, each of the processors 603, 703 may represent multiple processors 603, 703 and each of the memories 606, 706 may represent multiple memories 606, 706 that operate in parallel processing circuits, respectively. In such a case, the local interface 609, 709 may be an appropriate network that facilitates communication between any two of the multiple processors 603, 703, between any processor 603, 703 and any of the memories 606, 706, or between any two of the memories 606, 706, etc. The local interface 609, 709 may comprise additional systems designed to coordinate this communication, including, for example, performing load balancing. The processor 603, 703 may be of electrical or of some other available construction.

Although the data storage service 118, the applications 160, the storage client application 166, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3-5 show the functionality and operation of an implementation of portions of the storage client application 166 and the data storage service 118. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603, 703 in a computer system or other system. The machine code may be converted from the source code, etc. If embodied in hardware, each block may represent a circuit or a number of interconnected circuits to implement the specified logical function(s).

Although the flowcharts of FIGS. 3-5 show a specific order of execution, it is understood that the order of execution may differ from that which is depicted. For example, the order of execution of two or more blocks may be scrambled relative to the order shown. Also, two or more blocks shown in succession in FIGS. 3-5 may be executed concurrently or with partial concurrence. Further, in some embodiments, one or more of the blocks shown in FIGS. 3-5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the data storage service 118, the applications 160, and the storage client application 166, that comprises software or code can be embodied in any non-transitory computer-readable medium for use by or in connection with an instruction execution system such as, for example, a processor 603, 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   at least one computing device; and
   a data storage service executable in the at least one computing device, the data storage service comprising:
   logic that authenticates a first application executed on a first client computing device based at least in part upon at least one application-level security credential in response to receiving a request to store application preference data from the first application executed on the first client computing device, the first application being associated with a user, and the request to store specifying the at least one application-level security credential and being obtained by way of a network;
   logic that stores the application preference data in response to authenticating the first application executed on the first client computing device and in response to receiving the request to store the application preference data;
   logic that authenticates the first application executed on a second client computing device based at least in part upon the at least one application-level security credential in response to receiving a request to access the application preference data from the first application executed on the second client computing device, the request to access specifying the at least one application-level security credential and being obtained by way of the network;
   logic that provides the application preference data to the second client computing device by way of the network in response to authenticating the first application executed on the second client computing device and receiving the request to access the application preference data from the first application executed in the second client computing device; and
   wherein the data storage service is configured to store data for a plurality of applications associated with the user, the first application executed on the first client computing device and the first application executed on the second client computing device are associated with a common at least one application-level security credential, and the first application executed on the first client computing device and a second application executed on the second client computing device are associated with a different at least one application-level security credential.

2. The system of claim 1, wherein the request to access specifies an offset for a file, and the logic that provides is configured to read the application preference data from the file relative to the offset from a data store.

3. The system of claim 1, wherein the data storage service further comprises:
   logic that creates a file folder in response to receiving a request to create the file folder in a data store, the file folder being associated with the first application and the user, the request to create specifying at least one master security credential associated with the user, the at least one master security credential being used by the user to gain access to the application preference data;
   logic that automatically generates the at least one application-level security credential and associates the at least one application-level security credential with the file folder; and
   logic that returns the at least one application-level security credential to the first client computing device and the second client computing device by way of the network.

4. The system of claim 1, wherein the first application corresponds to a game, and the application preference data includes a saved state for the game.

5. The system of claim 1, wherein the request to store specifies an offset for a file, and the logic that stores is configured to update the file relative to the offset with the application preference data in a data store.

6. The system of claim 1, wherein the data storage service is operated by a third-party entity, and the third-party entity is not a publisher of the first application.

7. The system of claim 1, wherein the data storage service is configured to store data for another plurality of applications associated with the user and with a common publisher, and individual ones of the other plurality of applications associated with the common publisher are associated with a same at least one application-level security credential.

8. The system of claim 1, wherein the data storage service is configured to restrict the first application from accessing data stored on behalf of the second application associated with the user.

9. The system of claim 1, wherein the data storage service is configured to grant read only access to the second application for accessing data stored on behalf of the first associated with the user.

10. The system of claim 1, wherein the application preference data comprises a screen orientation preference.

11. The system of claim 1, wherein the application preference data configures a normalized hardware setting of the first client computing device.

12. The system of claim 1, wherein the application preference data comprises at least one of: a preferred language or a preferred audio level.

13. The system of claim 1, wherein the application preference data is associated with a group of applications, and the first application is a member of the group of applications.

14. The system of claim 1, wherein the data storage service further comprises logic that sends the application-level security credential to the first application executed in the second client computing device by way of the network, the application-level security credential being automatically generated by the data storage service.

15. A method, comprising:
receiving, by a data storage service executed via at least one of one or more computing devices, a request to store application preference data from a first application associated with a user, the first application being executed in a first client computing device, the request to store specifying at least one application-level security credential and being received by way of a network;
authenticating, by the data storage service executed via at least one of the one or more computing devices, the first application being executed in the first client computing device based at least in part upon the at least one application-level security credential in response to receiving the request to store the application preference data from the first application executed on the first client computing device;
storing, by the data storage service executed via at least one of the one or more computing devices, the application preference data in response to receiving the request to store and in response to authenticating the first application executed on the first client computing device;
authenticating, by the data storage service executed via at least one of the one or more computing devices, the first application executed on a second client computing device based at least in part upon the at least one application-level security credential in response to receiving a request to access the application preference data from the first application executed on the second client computing device, the request to access specifying the at least one application-level security credential;
providing, by the data storage service executed via at least one of the one or more computing devices, the application preference data to the second client computing device in response to authenticating the first application executed on the second client computing device and receiving the request to access the application preference data from the first application executed in the second client computing device; and
wherein the data storage service is configured to store data for a plurality of applications associated with the user, the first application executed on the first client computing device and the first application executed on the second client computing device are associated with a common at least one application-level security credential, and the first application executed on the first client computing device and a second application executed on the second client computing device are associated with a different at least one application-level security credential.

16. The method of claim 15, wherein the request to access specifies an offset for a file, and the application preference data is read from the file relative to the offset from a data store.

17. The method of claim 15, further comprising:
receiving, by the data storage service executed via at least one of the one or more computing devices, a request to create a file folder in a data store, the file folder being associated with the first application and the user, the request to create specifying at least one master security credential associated with the user, the at least one master security credential being used by the user to gain access to the application preference data;
creating, by the data storage service executed via at least one of the one or more computing devices, the file folder in response to the request to create;
automatically generating, by the data storage service executed via at least one of the one or more computing devices, the at least one application-level security credential and associating the at least one application-level security credential with the file folder; and
returning, by the data storage service executed via at least one of the one or more computing devices, the at least one application-level security credential to the first client computing device by way of the network.

18. The method of claim 15, wherein the data storage service is configured to store data for another plurality of applications associated with the user and with a common publisher, and individual ones of the other plurality of applications associated with the common publisher are associated with a same at least one application-level security credential.

19. The method of claim 15, further comprising restricting, by the data storage service executed via at least one of the one or more computing devices, the second application from accessing data stored on behalf of the first application associated with the user.

20. A non-transitory computer-readable medium embodying a program executable in at least one computing device, comprising:
code that authenticates a first application executed in a first client computing device based on at least one application-level security credential in response to receiving a request to store application preference data from the first application, the first application being associated with a user, the request to store specifying the at least one application-level security credential and being received by way of a network;
code that stores application preference data in response to authenticating the first application and in response to receiving the request to store the application preference data from the first application;
code that authenticates the first application executed on a second client computing device based at least in part upon the at least one application-level security credential in response to receiving a request to access the application preference data from the first application executed on the second client computing device, the request to access specifying the at least one application-level security credential; and code that provides the application preference data to the second client computing device in response to authenticating the first application executed on the second client computing device and receiving the request to access the application preference data from the first application executed in the second client computing device;

wherein the program is configured to store data for a plurality of applications associated with the user, the first application executed on the first client computing device and the first application executed on the second client computing device are associated with a common at least one application-level security credential, and the first application executed on the first client computing device and a second application executed on the second client computing device are associated with a different at least one application-level security credential.

21. The non-transitory computer-readable medium of claim 20, wherein the request to access specifies an offset for a file, and the application preference data is read from the file relative to the offset from a data store.

22. The non-transitory computer-readable medium of claim 20, further comprising:

code that creates a file folder in response to receiving a request to create the file folder in a data store, the file folder being associated with the first application and the user, the request to create specifying at least one master security credential associated with the user, and the at least one master security credential being used by the user to gain access to the application preference data;

code that automatically generates the at least one application-level security credential and associates the at least one application-level security credential with the file folder; and code that returns the at least one application-level security credential to the first client computing device by way of the network.

23. The non-transitory computer-readable medium of claim 20, wherein the program is configured to store data for another plurality of applications associated with the user and with a common publisher, and individual ones of the other plurality of applications associated with the common publisher are associated with a same at least one application-level security credential.

24. The non-transitory computer-readable medium of claim 20, further comprising code that restricts the second application from accessing data stored on behalf of the first application associated with the user.

* * * * *